United States Patent [19]

Butterfield et al.

[11] Patent Number: 4,747,674

[45] Date of Patent: May 31, 1988

[54] CONTRAST ENHANCEMENT FILTER

[75] Inventors: William F. Butterfield, Winchester; Kuang-Chou Chang, Lexington; Edmund J. McLelland, Plymouth; Leonard Polizzotto, Stow, all of Mass.

[73] Assignee: Polaroid Corporation, Cambridge, Mass.

[21] Appl. No.: 32,479

[22] Filed: Mar. 30, 1987

Related U.S. Application Data

[63] Continuation-in-part of Ser. No. 853,467, Apr. 18, 1986, abandoned.

[51] Int. Cl.$^4$ .......................... G02B 5/30; G02B 27/28; H05F 1/02
[52] U.S. Cl. ..................................... 350/399; 350/166; 361/220
[58] Field of Search ........................ 350/399, 164, 166; 361/220

[56] References Cited

U.S. PATENT DOCUMENTS

| | | | |
|---|---|---|---|
| 3,518,373 | 6/1970 | Cushera et al. | 350/166 |
| 3,576,356 | 4/1971 | Hyman | 350/399 |
| 3,962,488 | 6/1976 | Gillery | 350/166 |
| 4,168,986 | 9/1979 | Venis, Jr. | 106/291 |
| 4,278,736 | 7/1981 | Kamerling | 428/437 |
| 4,389,452 | 6/1983 | Chahroudi et al. | 428/215 |
| 4,526,818 | 7/1985 | Hoshikawa et al. | 428/1 |

FOREIGN PATENT DOCUMENTS 2012943 8/1979 United Kingdom .

OTHER PUBLICATIONS

Pulker, H. K., "Characterization of Optical Thin Films", *Applied Optics,* vol. 18, No. 12, pp. 1969-1972; Jun. 15, 1979.
Ebert, J., 1982, "Activated Reactive Evaporation" in *Optical Thin Films,* SPIE, vol. 325, pp. 29-38, 1982.

*Primary Examiner*—Bruce Y. Arnold
*Attorney, Agent, or Firm*—Louis G. Xiarhos

[57] ABSTRACT

A contrast enhancement filter having antistatic and antireflection properties is disclosed. The article comprises a plastic support sheet carrying on one side thereof a layer of indium tin oxide, and superposed upon said layer, an antireflection layer. A light-polarizing element is affixed to the opposed side thereof. The contrast enhancement filter can be used for the reduction of specular glare from the surface of cathode ray tubes, computer display screens and the like.

20 Claims, 1 Drawing Sheet

4,747,674

CONTRAST ENHANCEMENT FILTER

REFERENCE TO RELATED APPLICATION

This application is a continuation-in-part of our co-pending and commonly assigned application, U.S. Ser. No. 853,467, filed Apr. 18, 1986 now abandoned.

BACKGROUND OF THE INVENTION

This invention relates to the construction and design of a plastic optical device. More particularly, it relates to a plastic contrast enhancement filter useful for the reduction of specular glare from the surface of cathode ray tubes, computer display screens and the like.

The construction of a contrast enhancement filter, such as can be used in front of the faceplate of a cathode ray tube or computer display screen for enhancement of contrast and reduction of specular glare, has been known. Such a device is described, for example, in the U.S. Pat. No. 4,278,736, issued July 14, 1981, to M. A. Kamerling. Typically, a contrast enhancement filter suited to such applications will comprise a plastic sheet-like circular polarizing element as part of a multilayer laminated article. In the aforementioned U.S. Pat. No. 4,278,736, there is described a contrast enhancement filter which includes a pair of glass support members and which has a plastic light-polarizer laminated therebetween into a unitary assembly. Contrast enhancement filters comprising a lamination of a plastic circular polarizer element and a plastic sheet member carrying an antireflection layer have also been known and examples thereof have been commerically available from Polaroid Corporation under the trade designation CP-50 and CP-Custom.

In the manufacture of an optical sheet element, it will often times be advantageous to provide the outermost surface of the element, which faces the viewer, with an antireflection layer to minimize specular glare. The application of optical thin films to substrate materials for various purposes has been well known and the properties of, for example, dielectric thin films are reported by H. K. Pulker in Applied Optics. Vol. 18, No. 12, June 15, 1979. Frequently, the optical and structural properties desired in a particular thin film application will be influenced by the substrate temperature and the conditions required to suitably deposit the desired film. For example, the microstructure and integrity of an optical thin film coating is oftentimes enhanced by application of the film onto a heated substrate or by annealing the coated article. While a glass substrate material will normally be suited to manufacturing methods which involve application of coatings at elevated temperatures and may withstand an annealing treatment, various applications will be promoted by the use of plastic substrate materials, particularly, thin flexible plastic sheet materials, which are not adapted to such methods or treatments. Consequently, the nature of the substrate material will unfortunately restrict the choice of available materials which otherwise would be suited to a particular optical application.

In the production and use of plastic sheet elements of various types, the tendency of plastic sheet materials to exhibit static build-up and discharge has been recognized. In the case of a contrast enhancement filter, in position over the faceplate of, for example, a computer display screen, the build-up of static electricity, and the associated attraction of dust particles and required cleaning, may be annoying or distracting. It will, thus, be appreciated that it will be advantageous if there is provided a contrast enhancement filter which may be readily manufactured from low-cost plastic components and which exhibits good antistatic and antireflection properties.

SUMMARY OF THE INVENTION

It has been found that a contrast enhancement filter having desirable antistatic and antireflection properties can be provided in the form of a plastic article which comprises a transparent plastic sheet carrying on one side thereof indium tin oxide and antireflection layers, and having a plastic light-polarizing element on the opposed side of the plastic sheet.

Accordingly, the present invention provides a contrast enhancement filter having antistatic and antireflection properties, the filter comprising a transparent plastic sheet carrying on one side thereof, a layer of indium tin oxide, and superposed upon the indium tin oxide layer, an antireflection layer, and having affixed to the opposed side of the plastic sheet, a light-polarizing element.

The contrast enhancement filter, and the features, properties, advantages and applications thereof, will be better understood by reference to the detailed description of the invention provided hereinafter and the accompanying drawings.

DETAILED DESCRIPTION OF THE INVENTION

Figure 1:
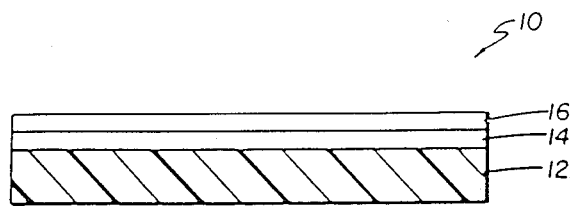
FIG. 1 is a diagrammatic, enlarged cross-sectional view of a component of the contrast enhancement filter of the invention, which component includes a transparent support sheet material carrying a combination of indium tin oxide and antireflection coatings.

As indicated above, the present invention provides a contrast enhancement filter which provides desirable antistatic and antireflection properties. Reference is now made to the accompanying drawings wherein like numbers, appearing in the figures, refer to like elements. In FIG. 1, there is shown a sheet element 10 comprising a transparent support material 12 carrying a layer of indium tin oxide 14 and superposed thereon a layer of antireflection material 16. Layer 14 serves to provide antistatic properties, while layers 14 and 16 function in combination to provide the desired antireflection properties of the element. Methods for the production of layers 14 and 16 onto element 10 are described in greater detail hereinafter.

Support material 12 can comprise any of a variety of transparent plastic sheet materials such as the cellulose esters (e.g., nitrocellulose, cellulose acetate or cellulose acetate butyrate), polyesters, polycarbonates, vinylic plastics such as the acrylics or vinyl chloride-acetate copolymers, or other plastic materials that can be provide in a sheet-like, light-transmissive form. Support material 12 can be rigid, semi-rigid or flexible. A particularly preferred plastic support material is polyethylene terephthalate which is useful from the standpoints of low cost, ready availability and ease of handling.

The thickness of the support material can vary to meet a particular application, although sheet-like support materials having a thickness of about 0.1 mil (0.00254 mm) to about 500 mils (12.7 mm) can be employed. In general, it will be preferred that the support material be a flexible sheet material having a thickness in the range of about 0.5 mil to about 20 mils, i.e., about 0.0127 mm to about 0.508 mm in thickness. Such flexible support material will be preferred from manufacturing and handling standpoints.

Indium tin oxide layer 14 serves principally to provide antistatic properties in the article of the invention. The layer will, however, dictate in part the antireflective properties of the article, inasmuch as the antireflective properties will depend, according to known principles of physics, upon differences in refractive indices, and such differences will be determined by the nature of the superposed antireflection layer 16. Layer 14 is a transparent film of indium tin oxide (hereinafter sometimes referred to a ITO) and is formed, for example, by sputtering or depositing indium tin oxide material onto support material 12. The indium tin oxide is used in a mixing ratio of $SnO_2$ to $In_2O_3$, generally, in the molar range of about 0.05:1 to about 200:1. Indium tin oxide layers and their method of deposition by magnetron sputtering are well known. Such layers exhibit electrical conductivity, being widely used as electrical conductive elements in optical displays, such as is disclosed, for example, in U.S. Pat. Nos. 4,387,133 and 4,526,818.

The electroactivity of the ITO layer provides antistatic properties which are especially beneficial in a plastic article prone to static build-up and discharge. The ITO layer 14 will generally be deposited onto the support material 12 at a thickness of about 130 to about 180 Angstroms. This can be accomplished by known magnetron sputtering methodology. A preferred thickness of ITO layer 14 is from 140 Angstroms to 160 Angstroms, e.g., 150 Angstroms. It will be appreciated that the thickness of ITO layer 14 will depend in part upon the thickness of the overlying antireflection layer 16, inasmuch as layers 14 and 16 function in concert to provide desired antireflection properties and may be varied to suit optimal antireflection properties.

Indium tin oxide layer 14 will generally be deposited onto a corona treated support material for improved adhesion of the layer to the support and to minimize the incidence of cracking or breaking of the deposited film, particularly on a flexible support material. Known corona discharge treatment or ion-bombardment technique can be used for this purpose.

Layer 16 serves important functions in the contrast enhancement filter of the invention in providing both antireflection and antiabrasion properties. The nature of layer 16 can vary from a wide class of materials which exhibit a low index of refraction and which serve to reduce reflection and increase transmission through what would normally be a reflective ITO layer 14. Layer 16 can be formed from inorganic refractive materials such as are well known in the art or from a polymeric material exhibiting a low index of refraction.

The nature of layer 16 as an inorganic or organic polymeric layer will be dictated largely by the particular requirements of the contrast enhancement filter and especially the durability or abrasion resistance required. In general, inorganic refractive materials will be the materials of choice where abrasion resistance is of particular importance.

Suitable inorganic materials for use in the provision of layer 16 include the oxides of tin, tungsten, titanium, cerium and vanadium and the dielectric material, magnesium fluoride. These materials are compatible with a plastic sheet material 12 and can be deposited over ITO layer 14 by resort to known vapor deposition, magnetron sputtering, plasma bombardment and like methods.

Preferred polymeric materials for use in providing antireflection layer 16 are the fluorinated polymers which posses several advantageous properties. The fluorinated polymers permit production of a durable and abrasion-resistant protective surface. They can be conveniently coated from solution at low temperatures so that the desired coating can be applied without injury to plastic sheet material 12. In addition, the fluorinated polymers have a low index of refraction such that an antireflection layer can be readily provided.

Examples of useful fluorinated polymers include the vinylidene fluoride homopolymers and copolymers, perfluorinated polyolefins and fluorinated acrylates and methacrylates. Preferably, the fluorinated polymers will exhibit an index of refraction of about 1.3 to 1.45, and more preferably, from about 1.35 to about 1.40. Examples of such fluorinated polymers include the perfluorinated polyolefins having an index of refraction of about 1.35 to about 1.45, e.g., polytetrafluoroethylene, such as disclosed in U.S. Pat. No. 3,617,354. Other fluorinated polymers which can be used include poly-(1,1-dihydropentadecafluoro-octyl acrylate) with an index of refraction of about 1.38; poly-(1-1-dihydropentadecafluoro-octyl methacrylate) with an index of refraction of about 1.38; a polymer having the repeating units of the following structure

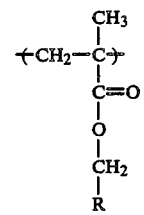

wherein R is perfluoro-cyclohexyl ($—C_6F_{11}$); Kynar 7201 (tradename of Pennwalt Chemical Co. for a copolymer of vinylidene fluoride and tetrafluorethylene); Kel F Elastomer 3700 (tradename of 3M Company for a 50/50 copolymer of vinylidene fluoride; dehydrofluorinated polyvinylene fluoride; Fluoropolymer B (tradename of E. I. du Ponte de Nemours for a 70/20/10 copolymer of vinylidene fluoride, tetrafluoroethylene and vinylbutyrate); and Viton A (tradename of E. I. du Ponte de Nemours for a 30/70 copolymer of hexafluoropropylene and vinylidene fluoride). Vinylidene fluoride polymers and copolymers are particularly useful and preferred herein.

Among the class of inorganic materials useful in forming antireflection layer 16, a preferred material is magnesium fluoride which provides good antireflection properties and which serves as an antiabrasion layer. The low index of refraction of magnesium fluoride (1.389), and particularly its index of refraction in relation to the underlying ITO layer (2.0–2.1) allows for considerable reduction of specular glare. In addition, the layer is strongly adherent to the ITO layer and shows a resistance to removal by physical abrasion such as is commonly incident to handling in manufacture or in use. The manner in which such abrasion resistance is obtained is not completely understood. It is believed, however, that such resistance may be the result of the microstructure or physical properties of the underlying sputtered indium tin oxide layer and the capacity of the magnesium fluoride layer to be strongly adherent thereto. Good abrasion resistance can, however, be realized; and the requirement of an annealing operation that would be injurious to a plastic sheet element is avoided.

The manner in which antireflection layer 16 is applied over ITO layer 14 will depend upon the particular nature of the antireflection material employed. For example, the inorganic antireflection materials hereinbefore mentioned can be deposited onto ITO layer 14 using known vapor deposition, magnetron sputtering, plasma bombardment or like methods. In the case of magnesium fluoride, a preferred method involves use of an electron-beam source of energy for vaporization of the magnesium fluoride. Desired film thickness can be provided by control of the speed at which the ITO-coated support is transported in the vacuum deposition chamber and the rate of heating of the magnesium fluoride.

Polymeric antireflection layers can be provided by providing a solution of the polymeric material, such as a fluoropolymer as mentioned hereinbefore, in a solvent material for coating by resort to known coating methods. Slot coating, dip coating, roll coating, spray coating or the like can be used to provide a polymeric antireflection layer 16. Preferred solvents for the coating of fluorinated polymers include the ketonic solvents such as methyl propyl ketone although other solvents such as Freon TF, trifluorobenzene and hexafluoro para-xylene can also be used. Other solvents can be used depending upon the polymer used for the provision of antireflection layer 16. In general, about 2% by weight of the polymer in the solvent will be employed with satisfactory results.

Antireflection layer 16 can be formed from a mixture of polymers. For example, it may be desired to include in a fluorinated polymer-containing layer 16 a content of non-fluorinated polymer, particularly an acrylic polymer such as polymethyl methacrylate, to provide improved adhesion, abrasion resistance or other desired properties. In general, the non-fluorinated polymer material, depending upon the index of refraction thereof, will be used in a minor proportion so as not to undesirably increase the index of refraction of the polymer layer. A polymer blend including for example, polymethyl methacrylate up to about 30% by weight can be employed. Other polymer mixtures can, however, be used to provide a suitable polymeric antireflection layer 16.

When a polymeric antireflection layer 16 is employed, it is preferred to use an isocyanate adhesion-promoting agent to promote adhesion of the layer to ITO layer 14. The isocyanate promotes the formation of a polymeric layer that is strongly bonded the the ITO layer 14. Generally, it will be preferred to include the isocyante adhesion-promoting agent as a component of the polymer-containing coating solution or fluid utilized for deposition of polymer layer 16. The isocyanate can however, be deposited as a discrete layer (not shown) onto which the polymer layer 16 can be deposited. The amount of isocyanate adhesion-promoting agent used in a coating solution can vary depending upon the nature of the particular polymer used to provide a polymeric antireflection layer 16. In general, the isocyanate is used in an amount of about 2.5% to about 7.5% by weight based upon the polymer solids in the coating solution or fluid. Preferably, the coating solution contains about 1 to about 2% of the adhesion-promoting isocyanate. Good results can be obtained, for example, where the isocyanate is applied at a coverage of about 1 to 30 mgs./ft.$^2$ (about 10.8 to about 343 mgs./m.$^2$).

A variety of isocyanate materials can be used including aliphatic isocyanates and aromatic isocyanates. Diisocyanates, polyisocyanates including oligomeric isocyanates, and isothiocyanates can be employed and are intended as being included with the term "isocyanate" as used herein. Examples of suitable isocyanates include methylene-bis-(4-phenylisocyanate), also known as MDI; phenylisocyanate; 3,3-dimethoxy-4,4-biphenyl diisocyanate; hexamethylene diisocyanate; hexyl isocyanate; n-butyl isothiocyanate; butyl isocyanate; and toluene diisocyanate, also known as TDI. Examples of polyisocyanates that can also be employed include those having the formula

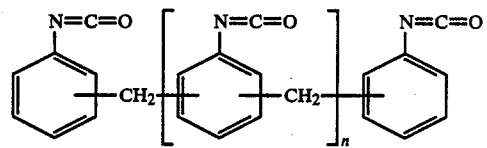

These materials are commercially available under the tradename designations PAPI, PAPI-50, PAPI-135 and PAPI-901.

The isocyanate is particularly advantageous from the standpoint of providing a strongly adherent polymer layer 16 and failure to use the isocyanate agent in some instances produces a layer which is readily removed by rubbing or abrasion.

As mentioned previously, agents intended to provide one or more desired functions can be included in polymeric antireflection layer 16. For example, UV stabilizers can be included to provide stability of the polymer layer against the degradative effects of ultraviolet radiation. A dimethyl siloxane polymer can be included as a leveling agent or for improved coatability and to provide improved abrasion resistance. Such material permits the production of a protective layer which can tolerate an increased level of abrasion. Such advantage is believed in part ot be attributable to a lowering of coefficient of friction by reason of the presence of the siloxane polymer.

The dimethyl siloxane polymers useful in this invention are fluids and have repeating units of the structure.

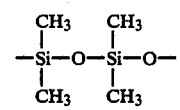

The polydimethyl siloxanes have an index of refraction very close to that of the fluorinated polymers and are especially suited in combination therewith. Suitable polydimethyl siloxane polymers are those available from Dow Corning Corp., Midland, Mich., under the tradename "Dow Corning 200 Fluid" as fluids having viscosities varying from 0.65 to 100,000 centistrokes. The polydimethyl siloxane polymer may also be used in the form of a paste containing finely divided silica, such as that sold by Dow Corning Corp. as "Dow Corning Stop Cock Grease".

The polydimethyl siloxane is added to a polymer coating solution in a quantity approximately 0.2% to 4.0% and preferably 0.5% to 3.0%, by weight of the total solids in the coating solution. The quantity of polydimethyl siloxane appropriate for any particular polymer coating composition may be determined by routine experimentation. The polydimethyl siloxanes are soluble, for example, in solvents useful in coating fluorinated polymers and give homogeneous coatings with fluorinate dpolymers. If silica is present it should be less than 100 mu in diameter so as not to interfere with obtaining smooth coatings as thin as a quarter wave.

The thickness of antireflection layer 16 can vary with the nature of the particular material employed to form such layer and especially will depend upon the index of refraction thereof. The principles of physics by which antireflection coatings function are well known and are described, for example, in U.S. Pat. No. 4,047,804 (issued Sept. 13, 1977 to R. K. Stephens). Thus, it is known, for example, that a transparent coating will reduce surface reflection from a contiguous and underlying transparent layer if the refractive index of the coating is less than that of the transparent layer to which it is applied and the coating is of appropriate optical thickness. As previously mentioned, each of layers 14 and 16 contributes to the observed antireflection properties of optical component 10 and contrast enhancement filter 30. By resort to known principles of physics, optimal thickness of layer 14 and 16 can be calculated, so that such layers in combination provide optimal antireflection at a wavelength of about 5500 Angstroms, but it is not essential that optimal values be used in order to obtain very beneficial results. In general, the thickness of antireflection layer 16 will be dictated by the amount of antireflection property desired and can be varied with the thickness of ITO layer 14 for optimal results. In the case of a preferred inorganic antireflection layer 16, a layer of magnesium fluoride of a thickness in the range of about 1050 Angstroms to about 1400 Angstroms, and preferably from about 1100 Angstroms to about 1300 Angstroms, will normally be employed. Good results can be obtained using, for example, a layer of magnesium fluoride of about 1200 Angstroms thickness over a layer of ITO of about 150 Angstroms thickness.

In the case of a fluorinated polymer as hereinbefore described, a layer of about 1050 Angstroms to about 1400 Angstroms can be employed over ITO layer 14. A preferred range is from about 1100 to about 1300 Angstroms and good results can be obtained using a thickness of such layer of about 1200 Angstroms over a layer of ITO of about 150 Angstroms thickness.

Figure 2:
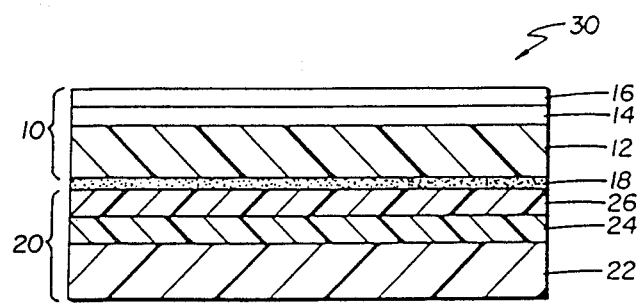
FIG. 2 is a diagrammatic, enlarged cross-sectional view of a contrast enhancement filter of the invention comprising the component of FIG. 1 attached to a light-polarizing element.

Referring to FIG. 2, there is shown a contrast enhancement filter or device 30 comprising sheet element 10 of FIG. 1 assembled in bonded relation through adhesive 18 to a light-polarizing element 20. As shown in FIG. 2, light-polarizing element 20 is a circular polarizer of conventional design consisting of a linear polarizer 26 in combination with a quarter-wave retardation plate 24 carried by support member 22. If desired, quarter-wave retardation plate 24 may be omitted, in which case, light-polarizing element 20 will function as a linear polarizer. A circular polarizer of the construction shown in FIG. 2 (including quarter-wave plate 24) will be preferred, however, in a contrast enhancement filter, as a circular polarizer is especially effective in minimizing the amount of light which emanates from the front side of a display tube and which tends to be reflected back to the user of such a display.

Polarizing layer 26 comprises a linear dichroic light-polarizing material, typically of a thickness in the range of about 0.1 to 3 mils (about 0.0025 to 0.076 mm). A preferred material to serve as polarizing layer 26 is a unitary layer of stretched (oriented) polyvinyl alcohol of about one-mil thickness (0.025 mm) stained according to known methods with a dichroic dye such as iodine. Such a polarizing material will also be preferably borated for improved stability. Suitable polarizing layers of this type can be prepared utilizing methods set forth in U.S. Pat. No. Re. 23,297 and in U.S. Pat. No. 4,166,871. Another preferred polarizing material is a stretched polyvinyl alcohol sheet containing polyvinylene light-polarizing species such as may be provided by hydrochloric acid vapor processing in known manner. Preferably, such polarizing material will be borated for improved stability. Suitable methods for the production of such polarizing materials are described in U.S. Pat. No. 2,445,555.

Quarter-wave retardation plate 24 can comprise a layer of oriented plastic material such as polyester or, preferably polyvinyl alcohol, sufficient to provide a quarter-wave of retardation, as is known in the art. Typically, quarter-wave retardation plate 24 will be affixed to transparent support material 22 through a suitable layer of adhesive (not shown). A transparent adhesive material of suitable environmental stability and adherency can be used for this purpose. Generally, an adhesive material of hydrophilic character will be desired where quarter-wave plate 24 is essentially of a polyvinyl alcohol constituency. Suitable adhesives include polyvinyl alcohol and urethane-based adhesive materials. The adhesive layer will normally be of thickness sufficient to achieve adequate bonding without adverse affect on optical transmission and, in general, will be used at a thickness of up to about one mil (about 0.025 mm). Polarizer layer 26 can be affixed to quarter-wave retardation plate 24 using an adhesive layer (not shown) generally of the type employed to affix retardation plate 24 to support 22.

Support material 22 of polarizer element 20 can comprise any of a variety of transparent plastic sheet materials. Suitable film materials include cellulose esters such as nitrocellulose, cellulose acetate, hydrolyzed cellulose triacetate, cellulose acetate butyrate, polyesters such as polyethylene terephthalate, polycarbonates, or vinylic polymers such as the acrylics. The thickness can vary and, in general, will be in the range of about 4 to 30 mil thickness, i.e., about 0.10 to about 0.76 mm thickness. A preferred material is cellulose actetate of about five-mil (0.13 mm) thickness.

In the production of light-polarizing elements, a well-known structural configuration comprises a layer of light-polarizing material sandwiched between a pair of support sheets. Light-polarizing elements of this design can be employed in the construction of a contrast enhancement filter. In this case, a second support layer (not shown) the same or similar to support layer 22 will be present between light-polarizing layer 26 and adhesive layer 18. Inasmuch as support layer 12 normally will provide a measure of support to article 30, an additional support in polarizer element 20 is not essential and may be omitted.

In constructing contrast enhancement filter 30, sheet element 10 can be suitably affixed to light polarizing element 20 through adhesive layer 18. Adhesive layer 18 can comprise any adhesive material effective to provide a stable lamination without adverse affect on optical transmission or performance. Good results can be achieved using a polyvinyl alcohol adhesive or a urethane-base adhesive material.

If desired, the several layers comprising the contrast enhancement filter 30 can be combined in other ways. For example, an article 10 comprising sheet material 12 carrying ITO layer 14 and antireflection layer 16 thereover can be prepared in the manner previously described and can be affixed, using an adhesive layer 18 to a stretched (oriented) layer of polyvinyl alcohol. The resulting article can then be passed into a staining bath comprising conventional iodine and iodide compounds conventionally employed in the production of light polarizers. The staining treatment can be conveniently accomplished, for example, by passing the article into the staining bath in a manner to allow only the polyvinyl alcohol surface thereof to contact the staining solution. A subsequent boration treatment can also be performed according to known methodology to provide a light polarizing layer 26 adhesively bonded to sheet 12. Separately, a quarter-wave retardation element can be fabricated comprising support sheet 12 and quarter-wave retardation plate 24 affixed to sheet 12 using an adhesive material (not shown). The resulting element can then be affixed to polarizer layer 26 by adhesively joining retardation plate 24 to light-polarizing layer 24 using an adhesive (not shown) to provide a contrast enhancement filter having the arrangement of layers shown in FIG. 2.

The following examples further illustrate the preparation of a contrast enhancement filter of the present invention and is intended to be merely illustrative and not limitive.

EXAMPLE 1

A polyester substrate (seven-mil polyethylene terephthalate web on a supply roll in communication with a take-up roll) was enclosed within a vacuum chamber divided into two separate coating stations. A first station was equipped with a 5"×12" (12.7 cm×30.5 cm) RF magnetron sputtering cathode and an indium tin oxide target (91% mole $In_2O_3$: 9% mole $SnO_2$). This first station was also equipped with a cooling drum to dissipate heat from the polyester. A second station was equipped with an electron beam gun (270° bent beam) and a hearth accomodating approximately 30 cc of magnesium fluoride. The respective stations were operated by a vertical nickel-plated iron plate.

In the sputtering area, ITO was deposited onto the polyester by traversing the web through the area at a source-to-substrate distance of approximately 2.25" (5.72 cm). This was done by evacuating the chamber to approximately $3\times10^{-6}$ torr and introducing oxygen, by means of a Grenville Phillips pressure control regulator, to maintain a partial pressure of oxygen at $3\times10^{-5}$ torr. Argon, used to generate the sputtering plasma, was then introduced using a Vacuum General automatic pressure controller. A partial pressure of 8 to $10\times10^{-3}$ torr was maintained throughout the deposition. The rate of deposition of the ITO coating was controlled by controlling the amount of power applied to the ITO target (1.75 Kw) and the speed of the substrate (4 ft./min.; 1.22 m./min.). Using these parameters, a layer of ITO with a physical thickness of 150 Å±10% was obtained. Resistivity of the ITO-coated film was 500 to 3500 ohms per square.

After the ITO deposition onto the web, the pressure control regulators were shut off and the chamber was evacuated to $1\times10^{-6}$ to $3\times10^{-6}$ torr for the performance of the magnesium fluoride deposition. A quartz crystal sensor head and a digital deposition controller were in place for monitoring and controlling the rate of magnesium fluoride to be deposited in the electron beam area. The sensor head and deposition controller were used to establish a steady state of magnesium fluoride deposition in advance of opening a shutter placed over the hearth. The supply and take-up roll directions were reversed to permit passage of the ITO-coated web through the magnesium fluoride station, at a source-to-substrate distance of approximately 10.5 inches (26.7 cm). The shutter was opened to allow for vapor deposition of the magnesium fluoride onto the ITO-coated web. Deposition was effected at $1\times10^{-6}$ to $3\times10^{-6}$ torr. Rate of deposition was controlled by the rate of evaporation and the speed of the substrate to provide a magnesium fluoride coating with a physical thickness of 1200 Å±10%. Resistivity of the resulting film was less than 10,000 ohms/square.

The ITO/magnesium fluoride coated web material was evaluated for surface reflection by affixing a sample to a black glass standard and measuring surface reflection from the coated side over a range of 380 to 770 nanometers, using a spectrophotometer. A reflection minimum (less than 0.3% reflection) was measured at 550 nm. Photoptic reflection, i.e., reflection over a range of wavelengths for human vision, was determined to be about 0.55%.

Abrasion resistance was evaluated by rubbing the coated surface of a sample with the eraser end of a pencil/eraser combination. The pencil was held by a moveable arm and weighted to apply a predetermine amount of force to the sample. Uniform and oft-repeated stroked were applied to the sample. Good abrasion resistance was obtained as judged by the number of strokes that could be applied before removal of the magnesium fluoride layer (evidenced by reduced antireflection properties an increase in conductivity).

EXAMPLE 2

A contrast enhancement filter was prepared in the following manner from the sheet element prepared as described in EXAMPLE 1.

A circular light-polarizing element was prepared according to the structure shown as element 20 in FIG. 2 and comprising a five-mil (0.13 mm) cellulose acetate butyrate support carrying an oriented polyvinyl alcohol quarter-wave retarding plate and a linear dichroic light-polarizing layer comprising an iodine-stained and borated sheet of stretched polyvinyl alcohol. The article of EXAMPLE 1 was adhesively bonded at the support side thereof to the polarizing layer of the aforedescribed circular light-polarizing element, using a polyvinyl alcohol adhesive.

The resulting article when placed over the faceplate of a cathode ray tube, computer display screen or the like, with the antireflection layer thereof facing the viewer, substantially reduces specular glare. In addition, the article exhibits antistatic and antiabrasion properties.

EXAMPLE 3

Using the procedure described in EXAMPLE 1, a polyester sheet (0.18 mm. thickness) was provided (on a first side thereof) with a coating of ITO having a thickness of 150±10 Angstroms. The ITO layer was then coated (by spin coating) with a composition containing by weight: 989.0 parts of methyl propyl ketone (dry), 6.05 parts of Kynar 7201 (tradename of Pennwalt Chemical Co. for a copolymer of vinylidene fluoride and tetrafluorethylene), 1.65 parts Kel F Elastomer 3700 (tradename of 3M Company for a 50/50 copolymer of chlorotrifluoriethylene and vinylidene fluoride and 3.30 parts of poly (methyl methacrylate), to which were added 1.65 parts of Hylene M-50 (tradename of E. I. du Pont de Nemours for a 50% by weight solution of undistilled methylene-bis-(4-phenyl-isocyanate) in monochlorobenzene) and 0.09 part of Dow Corning 200 Fluid (tradename of Dow Corning Corp. for a dimethyl siloxane polymer of 10,000 centistoke viscosity). The dried coating was an antireflection fluoropolymer layer having a physical thickness of about 1200 Angstroms and an optical thickness of one-eighth wave for a wavelength of approximately 0.55 micron. The coating showed good abrasion resistance when the coating was rubbed vigorously with a dry Kleenex brand facial tissue. The resulting article was a sheet element having the structure shown in FIG. 1.

Onto the opposed side of the sheet element carrying the ITO and fluoropolymeric antireflection layers, a sheet of stretched polyvinyl alcohol (stretched to four times its original length and at a 45° angle with respect to the machine direction) was adhesively bonded, using an aqueous polyvinyl alcohol adhesive containing zirconyl nitrate as an adhesion promoter. The resulting article was traversed over a staining bath (for the staining of the polyvinyl alcohol layer and conversion to a light-polarizing layer) in a fashion such that the surface of the polyvinyl alcohol contacted the staining bath (an aqueous iodine/iodide staining bath). The polarizing layer was then passed over an aqueous borating bath for boration of the light-polarizing layer.

A sheet of cellulose triacetate, having a thickness of 6.75 mils (0.17 mm.) was provided as a support sheet for a quarter-wave retardation element. Using an aqueous polyvinyl alcohol adhesive, a sheet of stretched (1.1:1) polyvinyl alcohol of one-mil thickness (0.025 mm.) was affixed to the cellulose triacetate sheet. Using an aqueous polyvinyl alcohol adhesive, the polyvinyl alcohol layer of the resulting element was affixed to the light-polarizing layer of the article described hereinbefore, to provide a constrast enhancement filter having the arrangement of layers shown in FIG. 2.

The present invention has been described in relation to certain preferred embodiments. Modifications and variations of the illustrated structures and designs can, however, be made within the spirit and scope of the invention.

What is claimed is:

1. A contrast enhancement filter having antistatic and antireflection properties, said filter comprising a transparent plastic sheet carrying on one side thereof, a layer of indium tin oxide, and superposed upon said indium tin oxide layer, an antireflection layer, said filter having affixed to the opposed side of said plastic sheet, a light-polarizing element.

2. The contrast enhancement filter of claim 1 wherein said layer of indium tin-oxide is a sputtered layer.

3. The contrast enhancement filter of claim 1 wherein said sputtered layer has a thickness in the range of about 130 Angstroms to about 180 Angstroms.

4. The contrast enhancement filter of claim 3 wherein said thickness is in the range of 140 Angstroms to 160 Angstroms.

5. The contrast enhancement filter of claim 1 wherein said antireflection layer comprises an inorganic layer.

6. The contrast enhancement filter of claim 5 wherein said inorganic layer comprises magnesium fluoride.

7. The contrast enhancement filter of claim 6 wherein said layer of magnesium fluoride has a thickness of about 1050 Angstroms to about 1400 Angstroms.

8. The contrast enhancement filter of claim 7 wherein said magnesium fluoride layer has a thickness of about 1100 Angstroms to about 1300 Angstroms.

9. The contrast enhancement filter of claim 1 wherein said antireflection layer comprises a polymeric layer.

10. The contrast enhancement filter of claim 9 wherein said polymeric layer comprises a fluorinated polymer layer.

11. The contrast enhancement filter of claim 10 wherein said fluorinated polymer has an index of refraction in the range of about 1.3 to about 1.45.

12. The contrast enhancement filter of claim 11 wherein said fluorinated polymer layer includes therein or as a layer contiguous thereto an effective amount of an isocyanate adhesion-promoting agent.

13. The contrast enhancement filter of claim 11 wherein said fluorinated polymer layer includes therein a dimethyl siloxane polymer.

14. The contrast enhancement filter of claim 10 wherein said fluorinated polymer layer has a thickness of about 1050 to 1400 Angstroms.

15. The contrast enhancement filter of claim 1 wherein said transparent plastic sheet comprises a flexible polyester sheet.

16. The contrast enhancement filter of claim 15 wherein said flexible polyester sheet comprises polyethylene terephthalate.

17. The contrast enhancement filter of claim 16 wherein the side of said sheet carrying said layer of indium tin oxide is corona discharge treated.

18. The control enhancement filter of claim 1 wherein said light-polarizing element is a circular light polarizer comprising, in combination, a linear light-polarizing layer and a quarter-wave retardation plate on a plastic sheet material.

19. The contrast enhancement filter of claim 18 wherein said light-polarizing layer comprises a polyvinyl alcohol linear dichroic light-polarizing layer.

20. The contrast enhancement filter of claim 18 wherein said plastic sheet material carrying said quarter-wave retardation plate comprises cellulose triacetate.

* * * * *